United States Patent
Huang et al.

(10) Patent No.: US 8,203,533 B2
(45) Date of Patent: Jun. 19, 2012

(54) TRACKBALL MODULE STRUCTURE

(75) Inventors: Hung-Ta Huang, Taipei (TW); Jen-You Hou, Taipei (TW); Tzung-Ye Wu, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 515 days.

(21) Appl. No.: 12/538,445

(22) Filed: Aug. 10, 2009

(65) Prior Publication Data

US 2010/0053086 A1    Mar. 4, 2010

(30) Foreign Application Priority Data

Aug. 26, 2008  (TW) .............................. 97132493 A

(51) Int. Cl.
*G09G 5/08* (2006.01)
*G09G 5/00* (2006.01)

(52) U.S. Cl. ........................................ 345/167; 345/156

(58) Field of Classification Search .................. 345/167, 345/156
See application file for complete search history.

(56) References Cited

U.S. PATENT DOCUMENTS

| | | |
|---|---|---|
| 7,323,959 B2 | 1/2008 | Naka et al. |
| 2004/0021638 A1 * | 2/2004 | Kaizaki et al. ................ 345/167 |
| 2005/0184957 A1 * | 8/2005 | Bricaud et al. ................ 345/157 |
| 2006/0290675 A1 * | 12/2006 | Bricaud et al. ................ 345/167 |

* cited by examiner

*Primary Examiner* — Kevin M Nguyen
(74) *Attorney, Agent, or Firm* — Muncy, Geissler, Olds & Lowe, PLLC

(57) ABSTRACT

A trackball module structure is provided. In the structure, a Hall IC is integrated in a flexible printed circuit, and the integrated structure and a trackball device are disposed on the base to be located. Afterwards, a lid is used to fix the integrated structure and the trackball device to form a module. The module is easy to be disposed on an electronic device. This not only solves the problem that the conventional trackball is hard to locate, but also prevents the ESD with the cooperation of a metal base and a metal lid.

11 Claims, 5 Drawing Sheets

TRACKBALL MODULE STRUCTURE

BACKGROUND OF THE INVENTION

1. Field of the Invention

The invention relates to a trackball module structure adapted to an electronic device and, more particularly, to a trackball module structure in which a trackball device and a control chipset are integrated to be a single module.

2. Description of the Related Art

Generally, a trackball is disposed on an electronic device to move a cursor. Especially to a portable electronic device such as a personal digital assistant, the trackball may facilitate the operation of a user. As shown in FIG. 1, it is a schematic diagram showing a conventional trackball. A trackball device 70 is formed by a ball 71, four magnetic rollers 73 and a casing 72 covering them. Afterwards, the trackball device 70 is disposed on the motherboard 75 of the electronic device. The motherboard 75 has four Hall ICs 74 corresponding to the magnetic rollers 73.

Thus, when the user rolls the ball 71, the magnetic rollers 73 rotate along with the rotation of the ball 71. Then, the Hall ICs 74 sense the magnetism change of the magnetic rollers 73 to make the cursor move according to the calculation of the electronic device. Thus, the relationship of the magnetic rollers 73 and the Hall ICs 74 may determine the sensing precision of the trackball.

However, to facilitate the operation of the user, the trackball device 70 should be fixed at the casing of the electronic device (not shown). The Hall ICs 74 are welded on the motherboard 75. Since manufacturing tolerance and assembling tolerance may exist between the trackball device 70 and the casing, the casing and the motherboard 75 and the motherboard 75 and the Hall ICs 74, the tolerance is accumulated, and the tolerance between the magnetic rollers 73 and the Hall ICs 74 may be large and is hard to be controlled. This not only affects the precision of the trackball, but also may affect the sensing ability and the operation of the user.

In the conventional technology, a reed switch is used to replace the Hall IC to reduce the cost and improve the reliability. However, since the assembly mode of the reed switch and the trackball device is not changed, the problem that tolerance accumulates still exists. Once the sensing ability is not good, even if the manufacturing cost is reduced, the reliability cannot be improved.

BRIEF SUMMARY OF THE INVENTION

The trackball module structure according to the invention includes a base, a flexible printed circuit, a trackball device and a lid. The base has a recess to dispose the flexible printed circuit, and the flexible printed circuit has a carrying portion and a connecting portion which are connected to each other. The carrying portion has a control chipset which is disposed in the recess of the base through the carrying portion. The connecting portion extends out of the recess, and it may be electrically connected to the circuit board of the electronic device. Then, the trackball device is disposed in the recess of the base corresponding to the control chipset and is fixed by the lid. Thus, the trackball device and the control chipset are modularized via the base. After located, the module is connected to the electronic device by the connecting portion of the flexible printed circuit. Thus, the conventional problem that the sensing ability is not good due to the difficult location of the trackball device and the control chipset is solved.

In another aspect, the base and the lid may be made of metal, and thus the problem of the electrostatic discharge (ESD) is solved.

These and other features, aspects and advantages of the present invention will become better understood with regard to the following description, appended claims, and accompanying drawings.

DETAILED DESCRIPTION OF THE EMBODIMENTS

Figure 1:
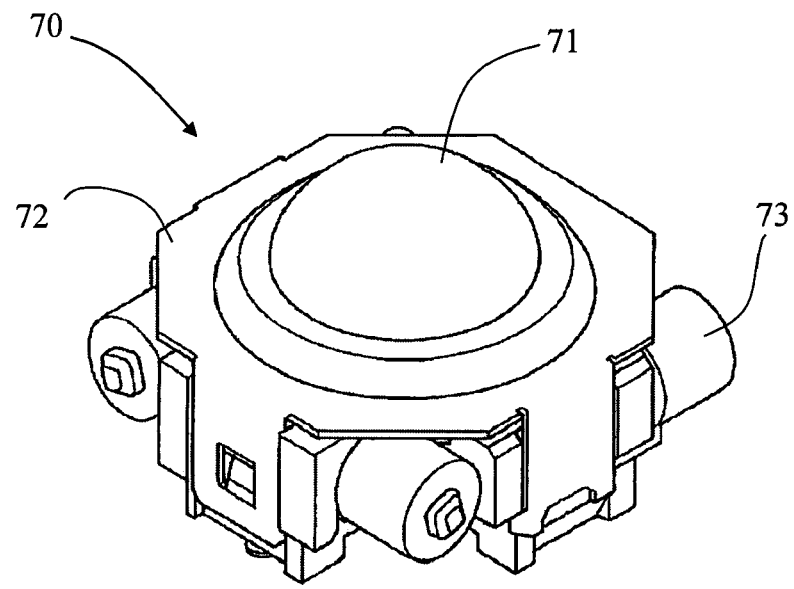
FIG. 1 is a schematic diagram showing that a conventional trackball is connected to an electronic device.
Figure 1:
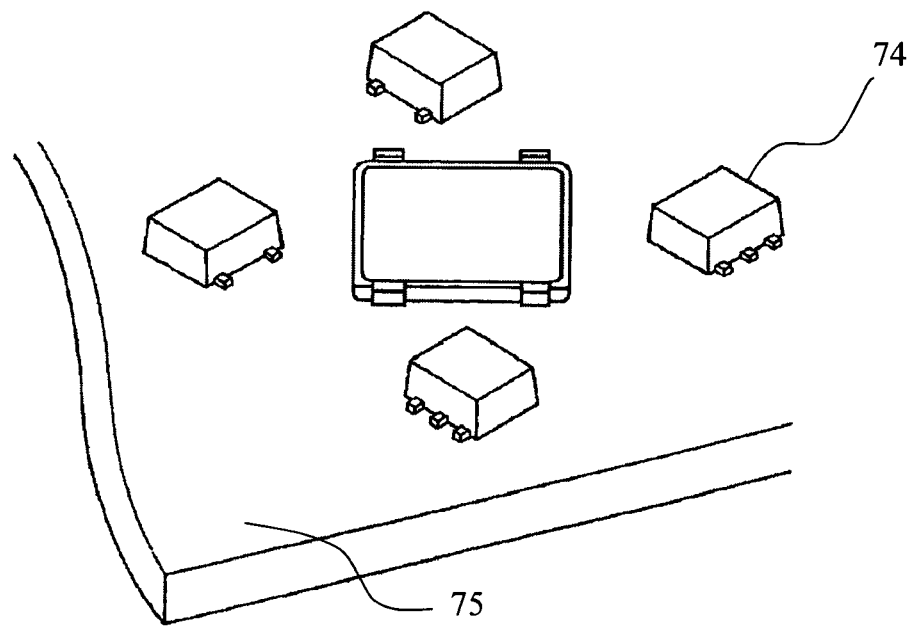
Figure 2:
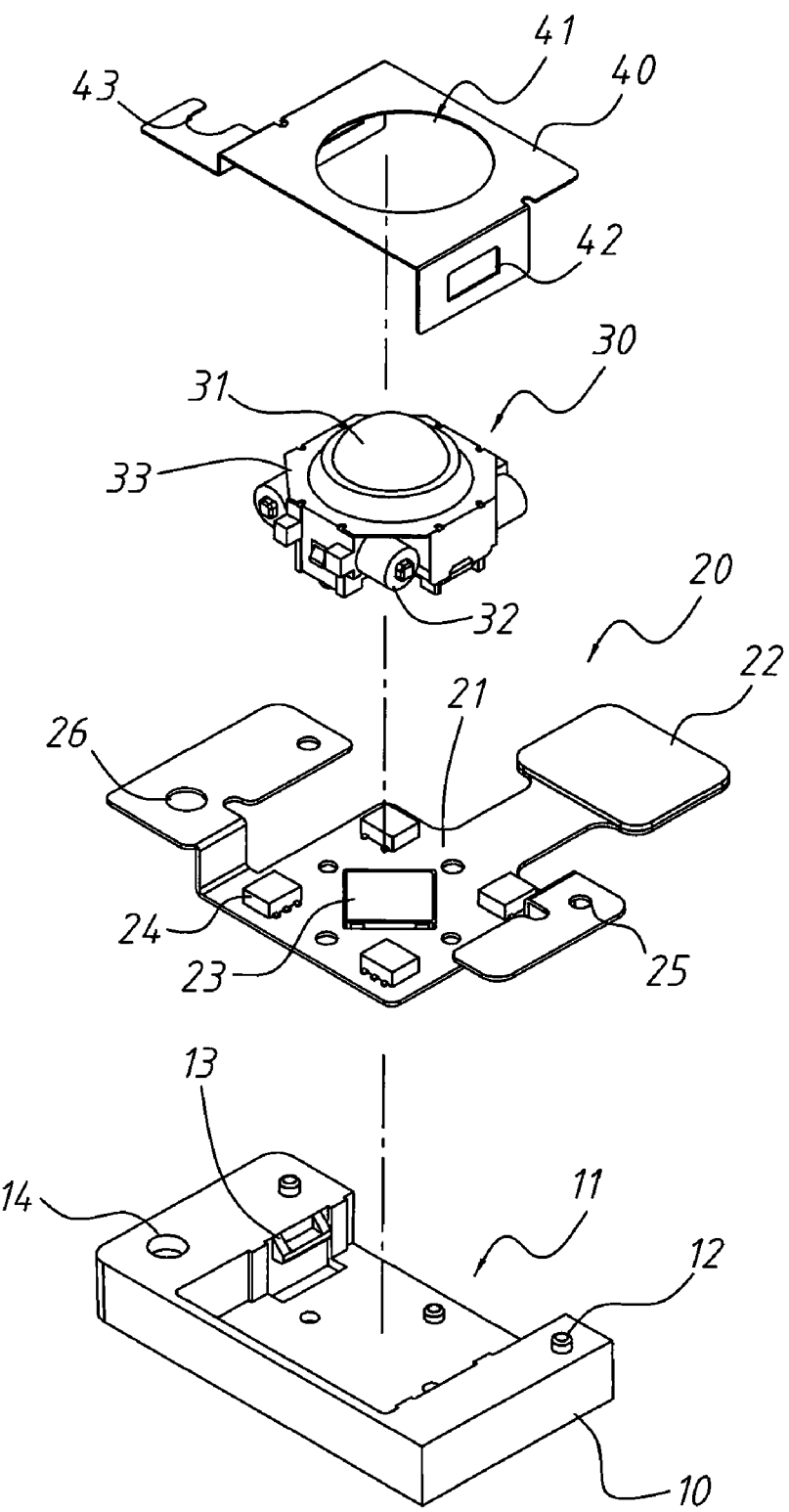
FIG. 2 is a schematic diagram showing a trackball module structure in an embodiment of the invention.

As shown in FIG. 2, according to the trackball module structure disclosed in the invention, it is a schematic diagram showing the trackball module structure in an embodiment of the invention. The trackball module structure includes a base 10, a flexible printed circuit 20, a trackball device 30 and a lid 40. The base 10 includes a recess 11. The recess 11 has a lateral opening for disposing the flexible printed circuit and the trackball device 30. The flexible printed circuit 20 has a connecting portion 22 and a carrying portion 21 which are connected to each other. The carrying portion 21 has a control chipset which is composed of four Hall ICs 24 and a push switch 23. The Hall ICs 24 may sense the rotation of the ball 31 of the trackball device 30. The push switch 23 is used to receive the motion of pressing the ball 31.

The trackball device 30 includes a ball 31 and four magnetic rollers 32. They are disposed in a frame 33. When the ball 31 rotates, it drives the magnetic rollers 32 to rotate. With the change of the magnetism of the magnetic rollers 32 and the sense of the Hall ICs 24, the moving distance is determined. The lid 40 has an opening 41, and the opening 41 corresponds to the ball 31 of the trackball device 30 to locate and expose the ball 31.

Figure 3A:
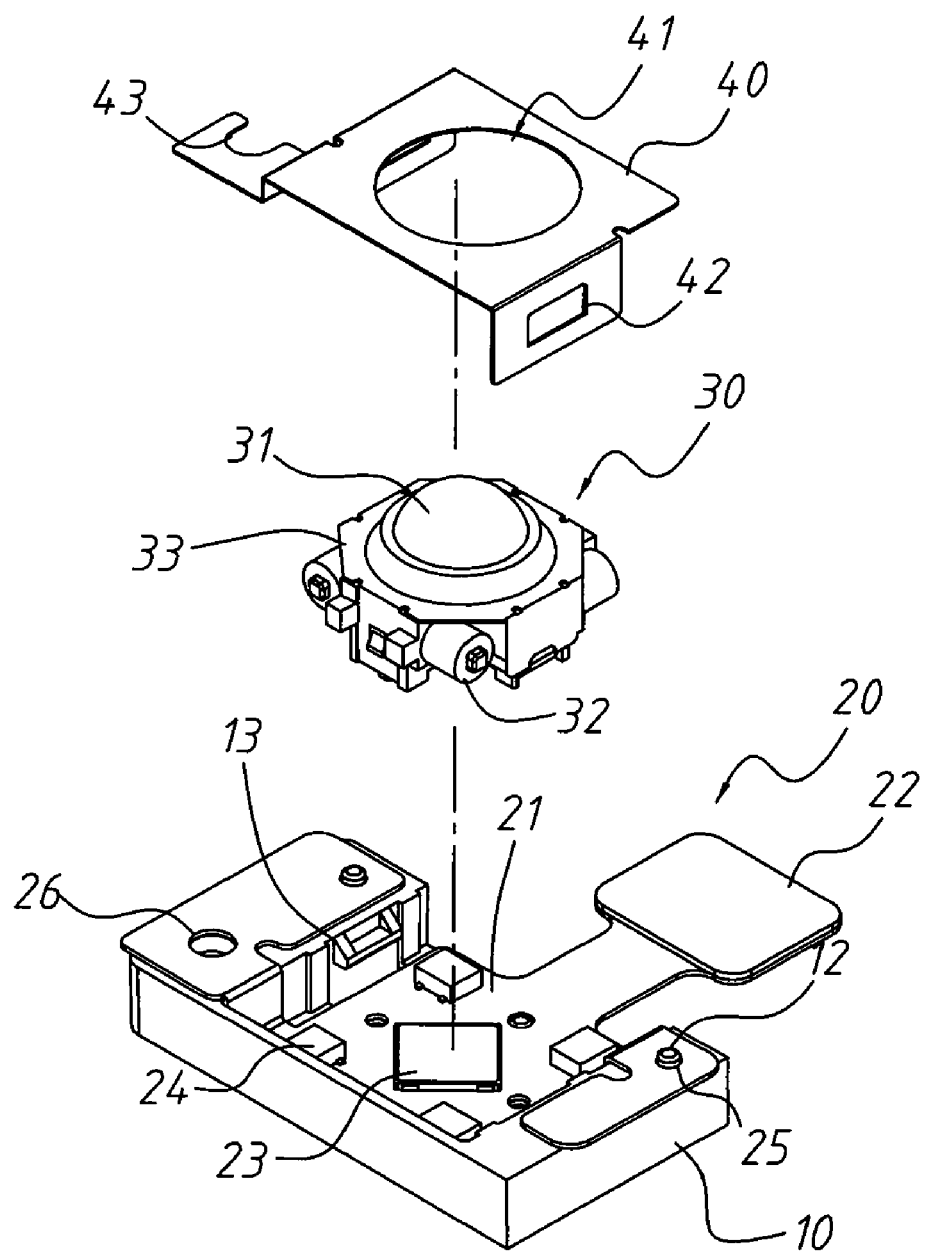
FIG. 3A to FIG. 3C are schematic diagrams showing the assembly of the trackball module structure in an embodiment of the invention.
Figure 3B:
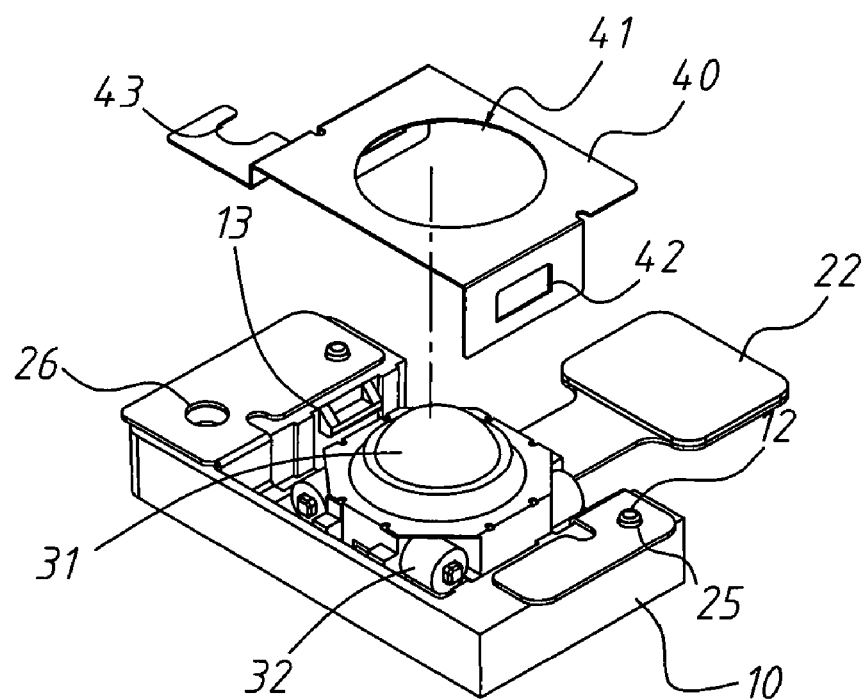
Figure 3C:
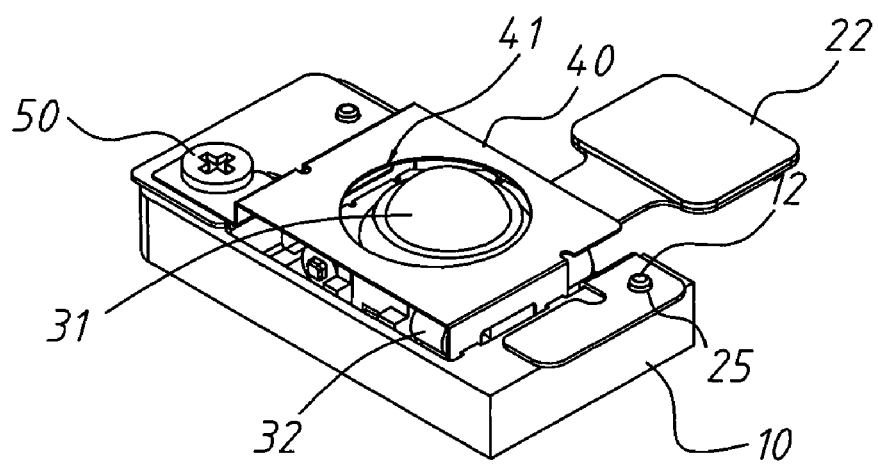

As shown in FIG. 3A to FIG. 3C, they are schematic diagrams showing the assembly of the trackball module structure in an embodiment of the invention.

As shown in FIG. 3A, the flexible printed circuit 20 is disposed in the recess 11 of the base 10. The flexible printed circuit 20 has multiple locating holes 25. Cooperating with the recess 11 of the base 10 and multiple locating pillars 12 at the edge of the recess 11, the locating pillars 12 pass through the locating holes 25, and thus the flexible printed circuit 20 is fixed and located in the recess 11 of the base 10. The locating mode is not limited to use the locating pillars 12 and the locating holes 25. If the size of the carrying portion 21 of the flexible printed circuit 20 is as large as that of the recess 11 of the base 10, the locating effect also may be achieved. In another aspect, if the flexible printed circuit 20 needs to be fixed on the base 10 stably, glue also may be used to stick the flexible printed circuit 20 in the recess 11 of the base 10.

As shown in FIG. 3B, after the flexible printed circuit 20 is located and fixed, the trackball device 30 is disposed in the recess 11 of the base 10 corresponding to the control chipset of the flexible printed circuit 20. In other words, the bottom of the ball 31 of the trackball device 30 corresponds to a push switch 23 of the flexible printed circuit 20. The magnetic rollers 32 of the trackball device 30 correspond to the Hall ICs 24 of the flexible printed circuit 20. Thus, when the ball 31 is pressed, the push switch 23 is triggered, and when the ball 31 drives the magnetic rollers 32 to rotate, the Hall ICs 24 sense the rotation and output the corresponding signal.

At last, as shown in FIG. 3C, the lid 40 is connected in the recess 11 of the base 10. The opening 41 of the lid 40 corresponds to the ball 31 of the trackball device 30. Thus, the ball 31 is located and exposed. The lid 40 has slots 42 at both sides, and hooks 13 are disposed in the inner sides of the recess 11 of the base 10. With the cooperation of the slots 42 and hooks 13, the lid 40 is fixed at the position. A screw 50 also may be used to pass the fixing hole 43 of the lid 40 and the fixing hole 26 of the flexible printed circuit 20 to be locked in the screw hole 13 of the base 10. This makes the module more stable. In the invention, the trackball module structure is fixed in the electronic device, and only the connecting portion 22 is electrically connected to the motherboard of the electronic device (not shown). This may improve the locating effect.

The trackball device 30 now is a mature element, and the sensing method using magnetic rollers 32 and the Hall ICs 24 is only one of the aspects. Trackball devices 30 using other sensing elements also may be adapted to the invention. Since the trackball device 30 is different from the conventional structure, that is, the trackball device 30 is held and sandwiched by the base 10 and the lid 40, and the base 10 and the lid 40 are made of metal, this may prevent the electrostatic discharge (ESD) effectively.

Figure 4:
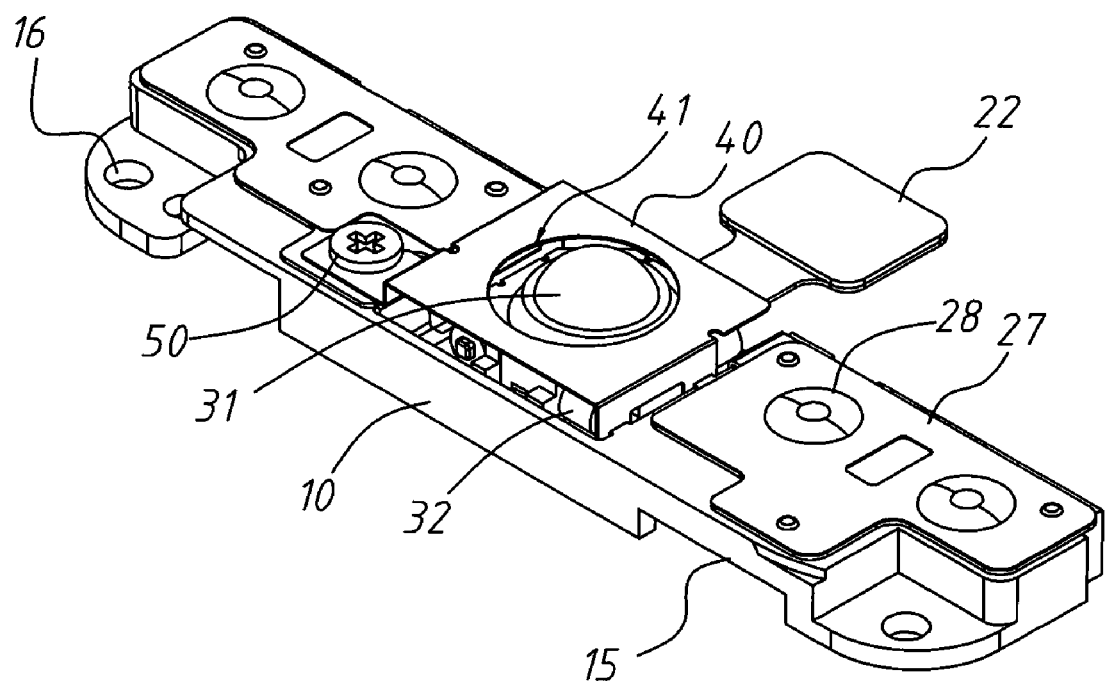
FIG. 4 is a schematic diagram showing the trackball module structure in another embodiment of the invention.

In another aspect, as shown in FIG. 4, it is a schematic diagram showing the trackball module structure in another embodiment of the invention.

To make it convenient to fix the structure at the electronic device, extending portions 15 extend from the two sides of the base 10, and the extending portion 15 has a fixing hole 16 to be fixed at the electronic device (not shown). The flexible printed circuit 20 may have a keypad circuit board 27 having multiple keypad connectors 28 to allow the electronic device to be used directly. Thus, the function of the trackball module structure is more complete. The extending portion 15 is not limited to be the aspect in the drawings, and the flexible printed circuit 20 also may have additional functions or provide different keypad connectors 28.

According to the trackball module structure in the invention, the trackball device and the control chipset are modularized using the base and the lid, and the whole module may be disposed on the electronic device. Thus, the disadvantages that tolerance may generate and accumulate and the sensing ability are not good when the trackball device is disposed at the casing and the control chipset is disposed at the motherboard is overcome. In addition, the base and the lid are made of material, and this may prevent the ESD.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A trackball module structure adapted for an electronic device, comprising:
    a base having a recess;
    a flexible printed circuit having a carrying portion and a connecting portion connected to each other, wherein the carrying portion has a control chipset which is fixed to the recess of the base via the carrying portion, and the connecting portion extends out of the recess to be electrically connected to the electronic device;
    a trackball device corresponding to the control chipset and disposed in the recess of the base; and
    a lid disposed on the recess of the base and fixing the trackball device to the base.

2. The trackball module structure according to claim 1, wherein the recess of the base has a lateral opening to expose the connecting portion and electrically connected to the electronic device.

3. The trackball module structure according to claim 1, wherein the base and the lid are made of metal.

4. The trackball module structure according to claim 1, wherein the control chipset comprises multiple Hall ICs and a push switch.

5. The trackball module structure according to claim 1, wherein the trackball device comprises a frame, a ball and multiple magnetic rollers, the ball and the magnetic rollers are disposed at the frame, and the magnetic rollers correspond to the control chipset.

6. The trackball module structure according to claim 5, wherein the ball rolls and drives the magnetic rollers to rotate, and the rotation of the magnetic rollers makes the control chipset output corresponding signals.

7. The trackball module structure according to claim 5, wherein the lid has an opening corresponding to the ball for locating the trackball device to the position corresponding to the control chipset and exposing the ball.

8. The trackball module structure according to claim 1, wherein the base has a fixing hole for fixing the electronic device.

9. The trackball module structure according to claim 1, wherein the flexible printed circuit is connected to a keypad circuit board.

10. The trackball module structure according to claim 9, wherein the base has an extending portion to carry the keypad circuit board.

11. The trackball module structure according to claim 1, wherein the flexible printed circuit has a locating hole, and the recess of the base has a locating pillar for locating the flexible printed circuit in the recess.

* * * * *